Sept. 16, 1958  J. VAN DYCK FEAR ET AL  2,852,438
ACID-CLAY TREATMENT OF PETROLEUM FRACTIONS
USING CENTRIFUGAL FORCE
Filed March 2, 1956
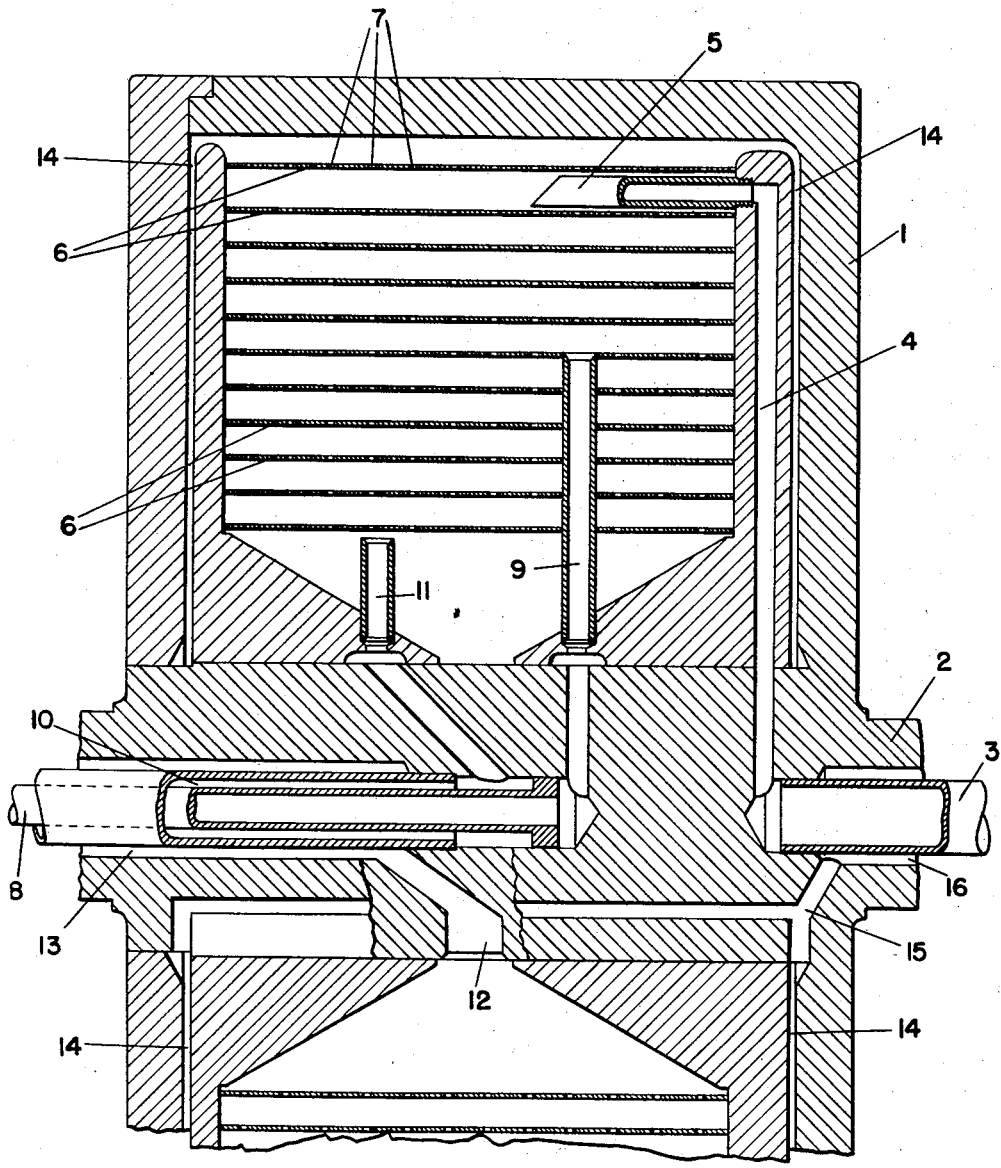
INVENTOR.
JAMES V. D. FEAR
FRANK R. SHUMAN JR
BY
Robert O. Spindle
ATTORNEY

United States Patent Office 2,852,438
Patented Sept. 16, 1958

2,852,438

ACID-CLAY TREATMENT OF PETROLEUM FRACTIONS USING CENTRIFUGAL FORCE

James Van Dyck Fear, Media, and Frank R. Shuman, Jr., Chester Springs, Pa., assignors to Sun Oil Company, Philadelphia, Pa., a corporation of New Jersey Application March 2, 1956, Serial No. 569,016

4 Claims. (Cl. 196—40)

This invention relates to the refining of petroleum fractions, and more particularly to an improved process for contacting petroleum fractions with acid and an adsorbent for the removal of color bodies, storage-unstable components of the fraction and/or other components that contribute to oxidation unstability of the fraction.

Treatment of petroleum fractions, ranging from gasoline to lubricating oils, with an acid such as sulfuric acid or other strong mineral acid, to remove nonhydrocarbon constituents such as nitrogen and sulfur compounds, and resinous or asphaltic materials, has long been practiced in the petroleum industry. Acid treatment is usually followed by treatment with an adsorbent such as clay, bauxite, activated charcoal or alumina and the like, in order to neutralize and remove acid materials resulting from the acid treatment, and to effect a further improvement in color. In treating with sulfuric acid, it is customary to agitate the oil to be treated with acid in the amount of from about 1 pound to 100 pounds or more of acid per barrel, depending on the nature of the oil and the degree of refinement desired. For example, in treating a solvent-extracted lubricating oil for improvement in color, as little as 1 or 2 pounds of acid per barrel of oil may suffice, whereas in the production of white oils, as much as 250 pounds per barrel may be required. After agitation with the acid, the oil and acid sludge are separated by settling or centrifuging.

The treated oil, which contains acid bodies such as alkyl sulfates or other reaction products, and pepper sludge resulting from the acid treatment, is then treated with the adsorbent either by percolation or contacting followed by filtration, to adsorb or neutralize the acid substances, and to effect a further reduction in color bodies or gum precursors.

Such conventional processes for both acid and adsorbent treating oils require separate treating facilities for each treating step, with attendant large capital investment, and are in essence, discontinuous processes requiring storage facilities between each step, which imposes an additional cost on the process.

It is an object of this invention to provide a method for treating petroleum fractions with acid and adsorbent which is continuous and which both operations are carried out simultaneously in a single treating vessel.

We have found that the foregoing object may be attained by conducting the acid and adsorbent treatment in a centrifugal extractor to which the oil to be treated is fed at a point near the periphery of the centrifuge wheel. Acid is admitted at a point between the point of admission of the oil and the hub of the wheel, while a slurry of adsorbent material such as clay in recycle treated oil is admitted at a point intermediate of the point of admission of the acid and the hub. The oil fraction will flow from its point of admission toward the hub of the centrifuge, being first contacted with acid, which is being thrown outwardly by centrifugal force, and then by the clay. Finished oil is recovered at the hub of the wheel, while an acid sludge-clay mixture is removed from the periphery. In this manner, the oil may be continuously processed, being first contacted with acid in an acid contact zone extending from the point of admission of the oil to the point of acid admission, and then contacted with clay in a clay contacting zone extending from the point of admission of the acid to the point of clay admission. It should be particularly noted that since centrifugal force greatly accentuates the gravity differential between the oil and the treating materials, the oil, as it leaves the acid contact zone, will be essentially free of pepper sludge, so that no clay is wasted in neutralizing sludge, and the oil leaving the clay contacting zone is free of suspended clay particles, so that there is no need to provide filtering facilities for removal of clay from the treated oil. In addition, due to the rapid separations possible under centrifugal force, high throughputs are obtained with small-sized equipment.

In order that those skilled in the art may more fully appreciate the nature of our invention and the method of carrying it out, an example of its operation will be described in connection with the accompanying drawing, which is a fragmentary cross-sectional view of a centrifugal wheel of a type useful in the practice of the invention.

Referring to the drawing, centrifuge wheel 1 and its hub 2 are adapted to be rotated by a suitable driving means, not shown. A solvent refined oil of lubricating viscosity S. U. S. 500 at 100° F. and of NPA color 2½ is continuously admitted to the interior of the rotating wheel under pressure at a temperature of 250° F. through inlet line 3, inlet passage 4, and distributor 5 to a point near the periphery of wheel 1, at a rate which will, of course, depend on the size of the centrifuge and the speed at which it is rotated. The oil, under the influence of pressure generated in wheel 1, will flow through baffles 6, which are provided with orifices 7, towards the hub of the wheel making countercurrent contact on its way with heated 93% sulfuric acid, in the amount of 5 pounds per barrel of oil, which is admitted, also under pressure, through acid inlet line 8 and passage 9. Baffles 6 and orifices 7 insure thorough mixing and contacting of the oil with the treating agents. After passage through the acid contacting zone, which extends from distributor 5 to the outlet of passage 9, the oil will flow countercurrently to Attapulgus clay, which is admitted as a heated slurry in previously treated oil through annulus 10 and passage 11, in a clay contacting zone, which extends from the level of the outlet of passage 9 to the level of the outlet of passage 11. Clay will be used in the amount of 12 pounds per barrel of oil feed.

As the oil passes the outlet of passage 11, it will be disengaged from the clay and a stable oil of color NPA 1¾ will be recovered through passage 12 and annulus 13, which connects with a product recovery line not shown. The clay and acid, which flow outwardly toward the periphery of wheel 1 during the contacting process are collected together at the periphery and flow out of the wheel via passages 14 and 15 and annulus 16. Means, such as a back-pressure valve on the products recovery line are, of course, provided to insure that there is at all times sufficient pressure in the interior of wheel 1 to force the acid-clay mixture out through the passages provided therefor.

Since the present invention is not directed to the apparatus in which the process is performed but to the process itself, only so much of the apparatus is illustrated as is necessary to an understanding of the operation of the process. As those skilled in the art will recognize, the drawing shows a modified Podbielniak centrifugal contactor. Such contactors will be provided with means for rotating the centrifuge wheel, and with suitable seals and connecting lines associated with the internal passages of the centrifuge to allow the feed streams to be passed from storage to the centrifuge and to allow the product streams to be passed to storage. Also, in order not to unnecessarily clutter up the drawing, but one inlet passage has been illustrated for each of the feed streams. In actual practice, a plurality of such inlet passages would be provided for each stream, arranged symmetrically about the hub in order to balance the wheel and to allow more even distribution of the feed. In addition, distributor heads might be provided at the outlet of passages 9 and 11.

While in the foregoing example the oil feed was heated to 250° F. to lower its viscosity to a point at which efficient contacting with acid and oil could be had, other means of lowering its viscosity could also be used. For example, it may be diluted with a light hydrocarbon such as propane or butane. If a diluent is used, the adsorbent may be slurried in diluent rather than treated oil prior to introduction to the centrifuge. Also, the oil to be treated need not be a lubricating fraction, since any petroleum fraction, such as gasoline or kerosene may be given, when desired, a combined acid-clay treatment in accordance with the foregoing description.

As may be readily seen from the foregoing, we have provided a method for carrying out an acid-clay treatment which allows a petroleum fraction to be simultaneously treated with acid and clay in a single vessel. Since the difference in specific gravity between the charge oil and the treating agents is greatly accentuated by centrifugal force, a clean separation of the oil from each of the treating agents is obtained, so as to produce in the centrifuge clearly demarcated acid treating and clay contacting zones, thus eliminating the need for any auxiliary separating means such as filters.

We claim:

1. A process for refining petroleum fractions which comprises continuously passing a petroleum fraction containing impurities removable by the action of acid and adsorbent material to the interior of a rotating centrifuge wheel at a point near the periphery thereof, continuously introducing acid to the interior of the centrifuge wheel at a point nearer to the hub of the centrifuge wheel than the point of introduction of the petroleum fraction, continuously introducing an adsorbent material to the interior of the centrifuge at a point spaced from the hub thereof, but nearer to the hub than the point of introduction of acid, continuously withdrawing a purified hydrocarbon fraction from the interior of the centrifuge wheel at a point closer to the hub than the point of introduction of the adsorbent and continuously withdrawing adsorbent and acid from the interior of the centrifuge wheel at a point nearer the periphery thereof than the point of introduction of the petroleum fraction.

2. The process according to claim 1 in which the adsorbent is clay.

3. The process according to claim 1 in which the acid is sulfuric acid.

4. The process according to claim 3 in which the adsorbent is clay.

References Cited in the file of this patent

UNITED STATES PATENTS

| | | |
|---|---|---|
| 2,093,645 | Podbielniak | Sept. 21, 1937 |
| 2,129,751 | Wells et al. | Sept. 13, 1938 |
| 2,538,066 | Walsh et al. | Jan. 16, 1951 |
| 2,652,975 | Angelo | Sept. 22, 1953 |
| 2,758,783 | Podbielniak | Aug. 14, 1956 |